(12) United States Patent
Kusama

(10) Patent No.: US 6,473,693 B1
(45) Date of Patent: Oct. 29, 2002

(54) NAVIGATION DEVICE FOR DISPLAYING AN APPROACHING INTERSECTION

(75) Inventor: Toshiki Kusama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/485,132

(22) PCT Filed: Jun. 12, 1998

(86) PCT No.: PCT/JP98/02606

§ 371 (c)(1),
(2), (4) Date: Feb. 4, 2000

(87) PCT Pub. No.: WO99/64822

PCT Pub. Date: Dec. 16, 1999

(51) Int. Cl.$^7$ ................................................. G06F 7/00
(52) U.S. Cl. ......................... 701/211; 340/995; 701/207
(58) Field of Search ........................ 701/202, 207–209, 701/211; 340/990, 995, 439; 342/357.13; 345/427

(56) References Cited

U.S. PATENT DOCUMENTS 5,893,045 A        4/1999   Kusama et al.
6,141,014 A    *   10/2000  Endo et al. .................. 345/427

FOREIGN PATENT DOCUMENTS

| EP | 0 678 731 A1 | 10/1995 |
|---|---|---|
| EP | 0 840 269 A1 | 5/1998 |
| JP | A3 26917 | 2/1991 |
| JP | A8 44996 | 2/1996 |
| JP | A8219800 | 8/1996 |
| JP | A9105640 | 4/1997 |
| JP | A9160487 | 6/1997 |
| JP | A9292254 | 11/1997 |

* cited by examiner

Primary Examiner—William A. Cuchlinski, Jr.
Assistant Examiner—Edward Pipala
(74) Attorney, Agent, or Firm—Birch, Stewart, Kolasch & Birch, LLP

(57) ABSTRACT

The present invention is adapted for use with a navigation device which performs 3 dimensional display on approaching an intersection. The navigation device of the present invention comprises a direction-of-travel detection means which detects a direction in which a vehicle is travelling, a direction-to-intersection detection means which calculates the difference between the direction in which a vehicle is travelling and a direction to an intersection position, a viewpoint direction calculation means which calculates a direction to a viewpoint in order to perform 3 dimensional display based on a difference between a detected direction in which a vehicle is travelling and a calculated direction, and a display means which performs display based on a calculated viewpoint direction. In this way, even when there is a large difference between direction in which the vehicle is travelling and the direction to the position of the intersection, it is possible to display the intersection.

6 Claims, 11 Drawing Sheets

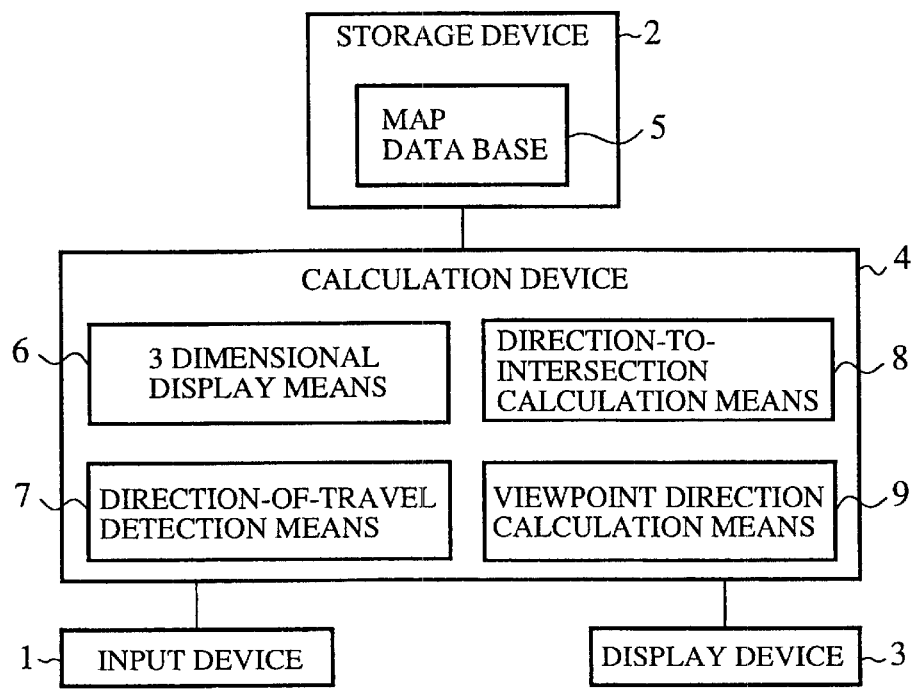
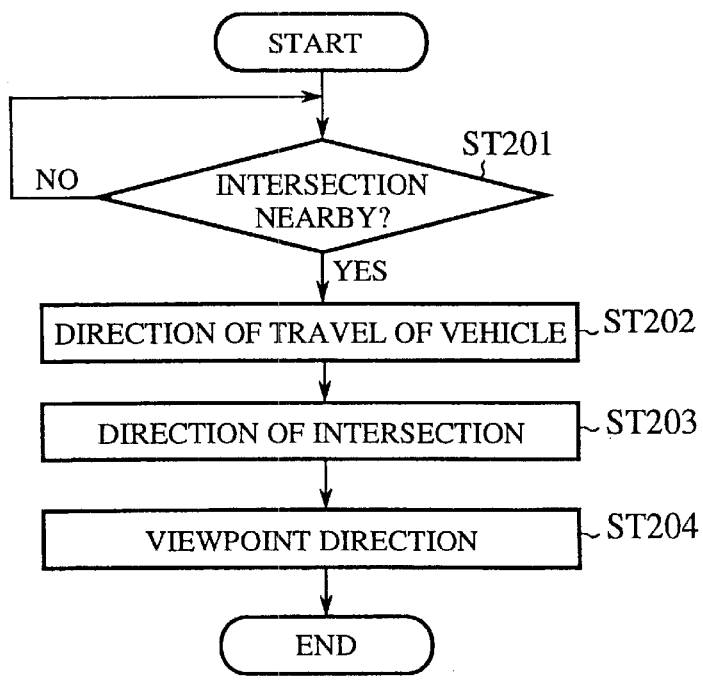

FIG.4
(a)
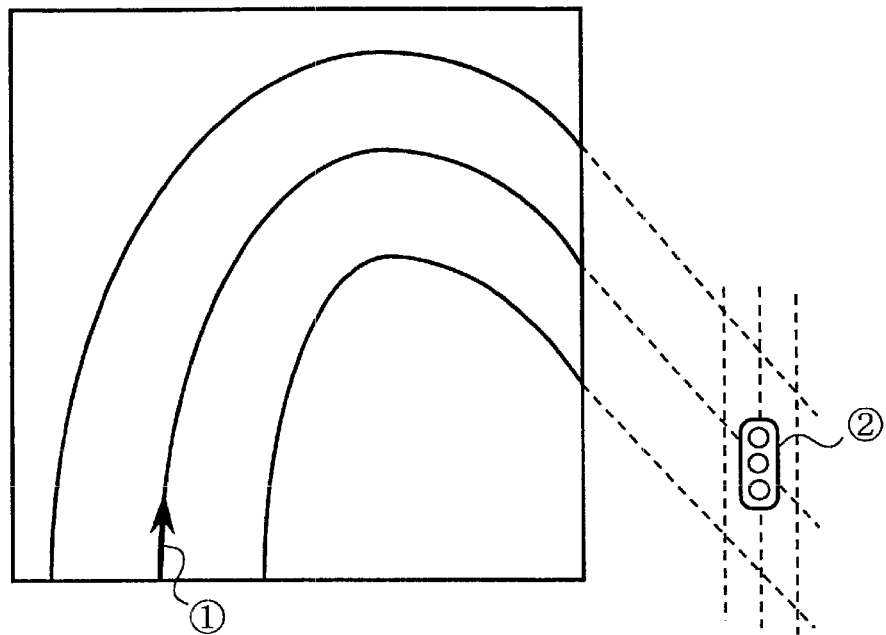
(b)
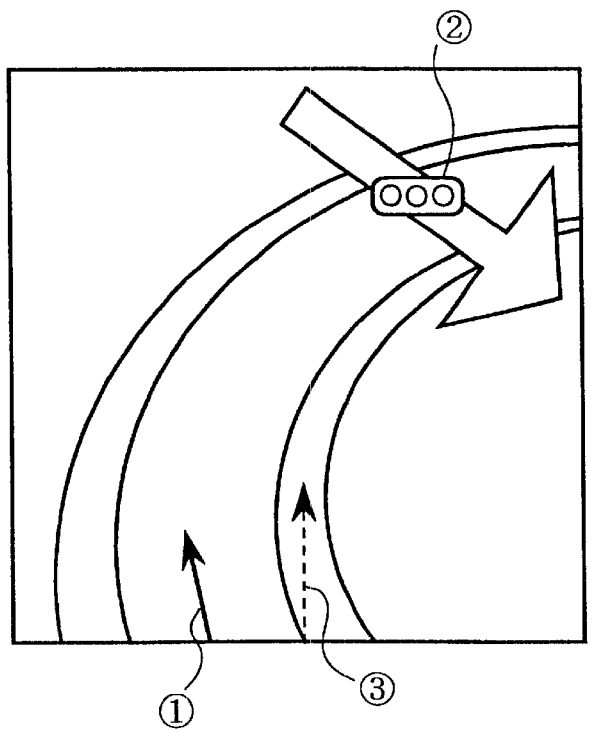

FIG.12
(a)
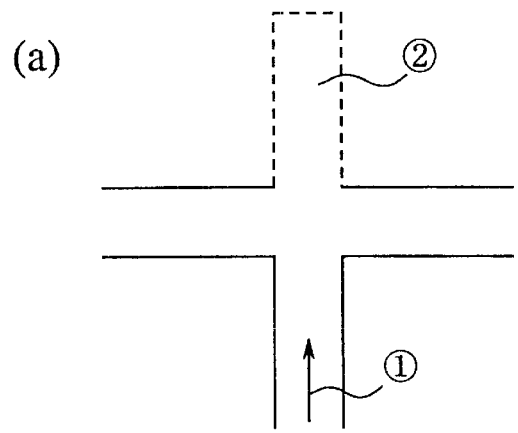
(b)
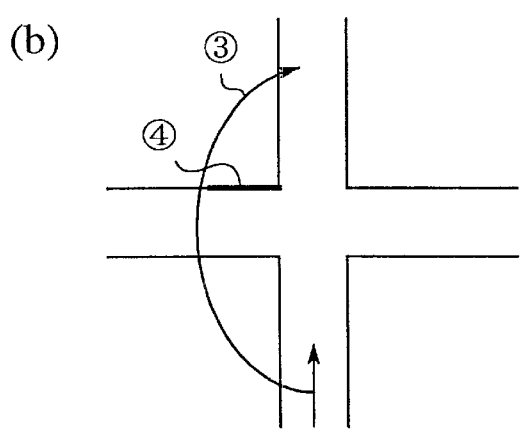
(c)
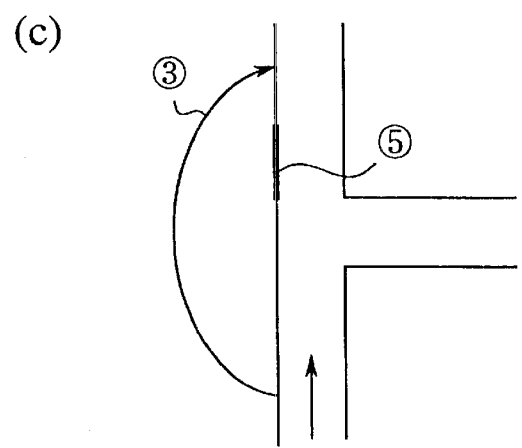

NAVIGATION DEVICE FOR DISPLAYING AN APPROACHING INTERSECTION

This application is the national phase under 35 U.S.C. § 371 of PCT International Application No. PCT/JP98/02606 which has an International filing date of Jun. 12, 1998, which designated the United States of America.

FIELD OF THE INVENTION

The present invention relates to a navigation device which performs a 3 dimensional display.

BACKGROUND OF THE INVENTION

FIG. 16 is a block diagram of a conventional navigation device. In the figure, 110 is a CPU (central processing unit) which performs various types of calculations. The CPU controls the vehicle position detection means 110A which detects the vehicle position on the basis of signals from a sensor or a GPS receiver, a route searching means 110B which searches a route to a destination from a detected vehicle position and a display conversion means 110C which converts route data read from a CD-ROM to bird's eye view data from a fixed viewpoint. 111 is a ROM (read on memory) which stores a program for various calculations performed by the CPU 110, 112 is a memory (DRAM) which stores calculation results and the like from the CPU 110 or data from a bearing sensor, distance sensor, GPS receiver, CDROM driver or the like. 113 is a backup memory (SRAM for preserving necessary data in the event of a power supply termination to the main device. 114 is a memory (Chinese characters, font ROM) which stores patterns such as signs or letters for display on the crystal display. 115 is an image processor for forming a display image based on map data or the vehicle present position. 116 is a memory (VRAM) which composes map data output from the CPU 110, present position data and Chinese characters, town names output from the font ROM 114 and fonts and Chinese characters for road names or the like and stores images displayed on the crystal display. 117 is a RGB conversion circuit for converting output data from the VRAM 116 to color data. The color signals are output from the RGB conversion circuit 117 to the crystal display. 118 is a communication interface.

The operation of the invention will be explained next.

FIG. 17 is a flowchart showing the operation of a conventional navigation device.

In a step ST1601, a display angle θx of the bird's eye view map which displays the distance from the vehicle position to the intersection. In a step ST1602, a bearing is determined from road network data read from a CD-ROM and the vehicle position. Conversion is performed to a bird's eye view map at the angle θx calculated in a step ST1601 and an enlarged screen is prepared so that the direction of progress is in an upward direction. In a step ST1603, it is determined whether an intersection has been reached and in the event that the intersection has been reached, the routine is terminated.

Steps ST1601, 1602, 1603 are repeated as shown in FIG. 17 until an intersection is reached from a current vehicle position. The angle θx approaches 0 as the vehicle position approaches the intersection. When the vehicle position is distant from the target intersection, the viewpoint is low, and as shown in FIG. 18(a), the display range is wide. However as the vehicle approaches the target intersection, the viewpoint rises, and as shown in FIG. 18(b), the display range narrows to express the distance in an easily understandable form. Furthermore when the vehicle position has almost reached the intersection, the viewpoint is roughly above the target intersection and becomes a bird's eye view map as shown in FIG. 18(c).

As the conventional navigation device is constructed as above, the display range narrows as the intersection is reached. For example, when the difference between direction in which the vehicle is travelling and the direction to the position of the intersection is great, the problem has arisen that it has not been possible to display the intersection.

The present invention is proposed to solve the above problems and has the object of providing a navigation device which can display an intersection even when there is a great difference the direction in which the vehicle is travelling and the direction to the position of the intersection.

DISCLOSURE OF THE INVENTION

The navigation device of the present invention is a navigation device which performs a 3 dimensional display when approaching an intersection. The navigation device comprises a direction of travel detection means which detects the direction-of-travel of the vehicle, a direction-to-intersection detection means which calculates the difference between the direction of travel of the vehicle and the direction to the position of the intersection, a viewpoint direction calculation means which detects the direction of the viewpoint in order to perform 3 dimensional display based on the difference between a detected direction of vehicle travel and a calculated direction, and a display means which performs display based on a calculated viewpoint direction.

As a result of this arrangement, even when the difference between the direction in which the vehicle is travelling and the direction to the position of the intersection is great, it is possible display the intersection.

The navigation device of the present invention is a navigation device which performs a 3 dimensional display when approaching an intersection. The navigation device comprises a vehicle position detection means which detects a vehicle position, an intersection distance calculation means which calculates a distance from a detected vehicle position to an intersection, a viewpoint position calculation means which calculates the height of the viewpoint so that the height of the viewpoint for the purposes of 3 dimensional display is reduced as the distance from the calculated vehicle position to the intersection is reduced, and a display means which carries out a display based on the calculated viewpoint height.

As a result of the above arrangement, it is possible to create a more realistic appearance of approaching the intersection.

The navigation device according to the present invention is adapted to perform three dimensional display on approaching an intersection. The navigation device is provided with a traffic signal disposition means which disposes a traffic signal at a position which is close to an actual position on an intersection when an intersection is determined to exist in a direction of vehicle travel, and a display means which displays a traffic signal on a disposed position.

The navigation device of the present invention is a navigation device which performs a 3 dimensional display when approaching an intersection. The device comprises a road existence determination means which determines whether or not a road exists on the left side as seen from the direction in which the vehicle is travelling at the intersection, a signal mechanism disposal means which disposes a signal mechanism at a position facing the direction of right turn in the road in the vicinity of the intersection when a road is determined to exist, and which disposes a signal mechanism at a position facing the direction of left turn in the road in the direction in which the vehicle is travelling in the vicinity of the intersection when a road is determined to not exist, and a display means which carries out a display which disposes a signal mechanism at a disposed position.

As a result of the arrangement above, it is possible to perform a 3 dimensional display at the intersection in a realistic form.

The navigation device of the present invention is a navigation device which performs a 3 dimensional display when approaching an intersection. It comprises a signal generation means which a right-hand or a left-hand signal at the intersection when the vehicle approaches an intersection which turns left or right, a road width correction means which corrects a road width of roads crossing intersections other than the target intersection when the vehicle approaches a right or left turning intersection, a display means which displays a generated signal on an intersection and which displays intersections other than the target intersection with a corrected width.

By the above arrangement, it is possible to recognize a right or left turning intersection without errors.

BRIEF EXPLANATION OF THE FIGURES

FIG. 1 is a block diagram of a navigation device according to a first embodiment of the invention.

FIG. 2 is a flowchart showing the operation of a first embodiment of the invention.

FIG. 4 explains a result of a first embodiment of the present invention.

FIG. 12 explains the operation of a third embodiment of the present invention.

PREFERRED EMBODIMENTS OF THE INVENTION

Figure 3:
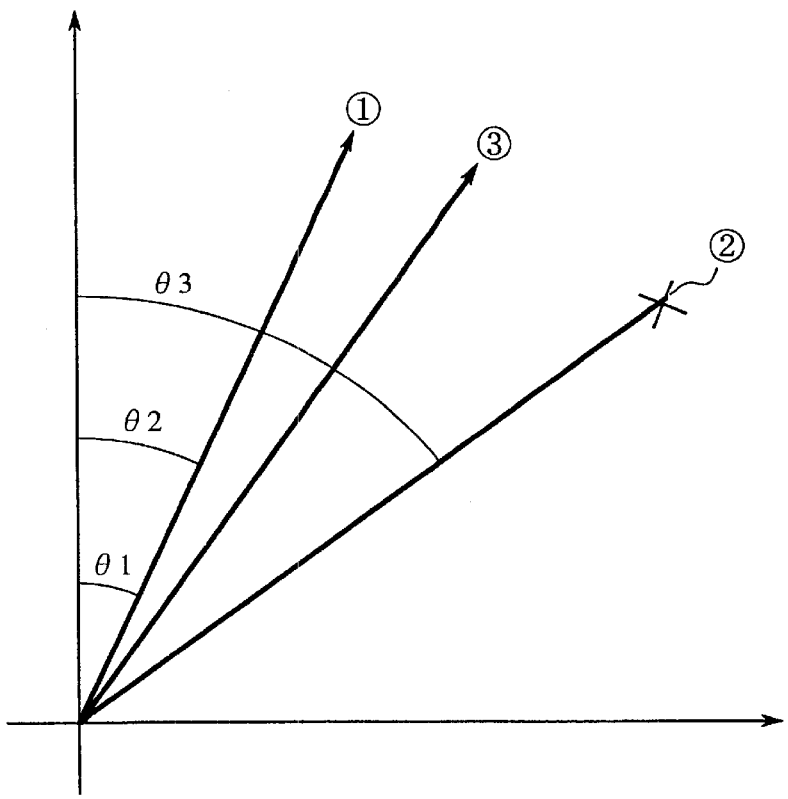
FIG. 3 explains the operation of a first embodiment of the invention.

The preferred embodiments of the invention will be explained below in detail with reference to the accompanying figures.

Embodiment 1

FIG. 1 is a block diagram showing the layout of a navigation device according to a first embodiment of the present invention.

In FIG. 1, 1 is an input device such as keyboard or a pointing device which inputs a destination, 2 is a storage device such as a data base which stores necessary information for searching and guiding the route, 3 is a display device which such as a CRT or a crystal panel which performs display in order to guide the route and which functions as a display means, 4 is a calculation device which controls the above devices and which executes search and guide processing of the route.

The storage device 2 is provided with a data base 5 which stores map data necessary for the searching and guiding of a route.

The calculation device 4 comprises a 3 dimensional display means 6, a direction-of-travel detection means 7, a direction-to-intersection calculation means 8 and a viewpoint direction calculation means 9.

The 3 dimensional display means 6 performs 3 dimensional display when the vehicle approaches an intersection by the appropriate control of the height of the viewpoint, the angle of viewpoint and the interval of the vehicle and the viewpoint in order to execute display. The direction-of-travel detection means 7 detects a direction in which the vehicle is travelling based on gyro-data or GPS data from a receiver not shown in the figure. The direction-to-intersection calculation means 8 calculates the direction to the position of the intersection (the intersection direction) from the present position of the vehicle based on map data and the detection results above. The viewpoint direction calculation means 9 calculates a viewpoint direction (upper screen direction) for displaying the 3 dimensional image based on the difference between the detected direction of travel of the vehicle and the calculated direction.

The operation of the invention will now be explained.

FIG. 2 is a flowchart showing the operation of a first embodiment of the invention.

In a calculation device 4, on approaching an intersection (step ST201), firstly a direction-of-travel detection means 7 detects a direction of travel of a vehicle (step ST202) and a direction-tointersection calculation device 8 calculates a direction of travel of the vehicle and the direction to the position of the intersection (step ST203). As shown in FIG. 3, the viewpoint direction calculation means 9 calculates a viewpoint direction θ3 for performing 3 dimensional display based on detected intersection direction θ2 and the detected direction of vehicle travel θ1 (step ST204). The viewpoint direction θ3 is calculated for example by the formula below.

$$\theta 3 = (a\theta 1 + b\theta 2)/(a+b) \tag{1}$$

In the above formula, a and b are constants and may be set for example as a=b=1.

As shown above, according to the first embodiment of the invention, when 3 dimensional display is performed in the vicinity of an intersection, for example as shown in FIG. 4(a), when there is a large deviation between the position of the direction of travel ① and the intersection direction ②, it is not possible to display the intersection. However in FIG. 4(b), since the direction of the viewpoint is set to a medial direction ③ of, for example, the direction of travel ① and the intersection direction ②, it becomes possible to display the intersection.

When the direction of the viewpoint is set to a medial direction of the direction of travel and the intersection direction, efficient display of the road to the intersection is enabled on the screen.

For example, when a road to the intersection which turns greatly to the right-hand side in the direction of travel is displayed, the road can only be displayed on the right-hand side of the screen when the direction of the viewpoint is the direction of travel. Furthermore when the direction of the viewpoint is the direction to the intersection, the road can only be displayed on the left-hand side of the screen. In contrast, when the direction of the viewpoint is set to a medial direction of the direction of travel and the intersection direction, the road may be displayed on both sides of the screen and efficient display of the road to the intersection is achieved.

Furthermore in the first embodiment, a, b which are the constants used to calculate the direction of the viewpoint θ3 may be varied depending on the degree of curve (curvature) of the road to the intersection. Thus it is possible to further vary the display of the road on the screen in an efficient manner.

Figure 5:
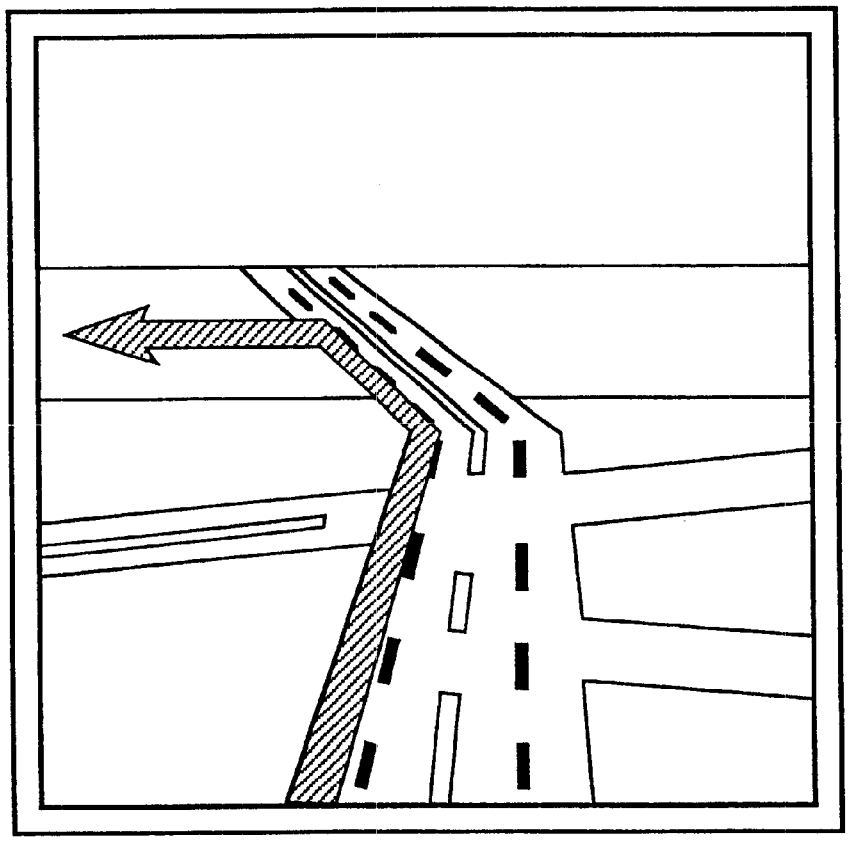
FIG. 5 shows a display example of a first embodiment of the present invention.

Furthermore FIG. 5 shows an example of a display in accordance with the first embodiment of the present invention. The arrow in the figure shows the direction in which the route is guided. Furthermore the guided route is displayed on left vehicle lane of the road. The intersection which is indicated as turning left ahead is the target intersection. The present position mark in the figure is not displayed, however it is possible to display a present position mark on the arrow displayed on the screen.

Embodiment 2

Figure 6:
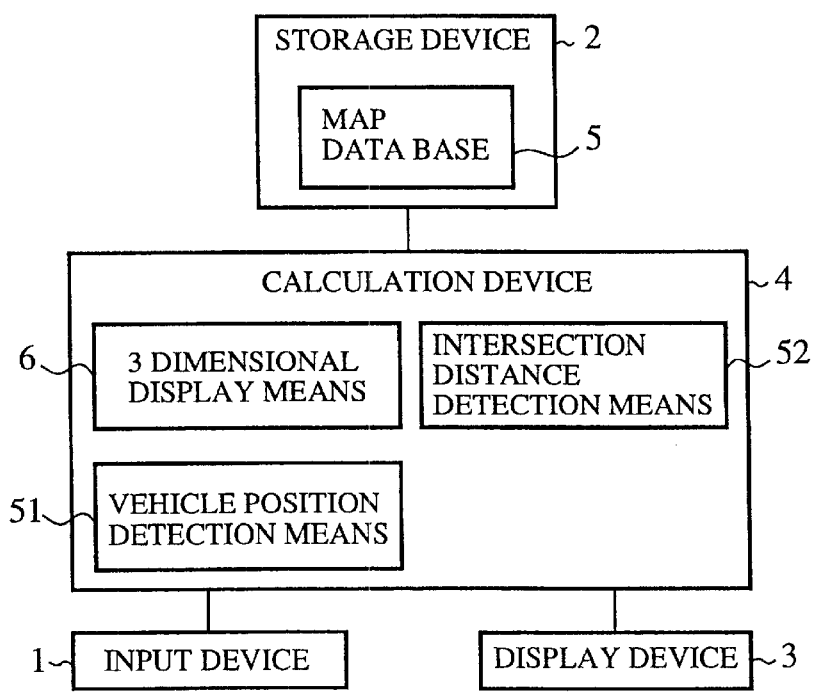
FIG. 6 is a block diagram of a navigation device according to a second embodiment of the present invention.

FIG. 6 shows the layout of a navigation device according to a second embodiment of the present invention. The same elements as in FIG. 1 are designated by similar reference numerals and will not be explained again here. In this navigation device, a calculation device 4 comprises a vehicle position detection means 51 which detects a vehicle position, and a intersection distance calculation means 52 which calculates the distance of the detected vehicle position and the intersection.

The operation of the invention will now be explained.

Figure 7:
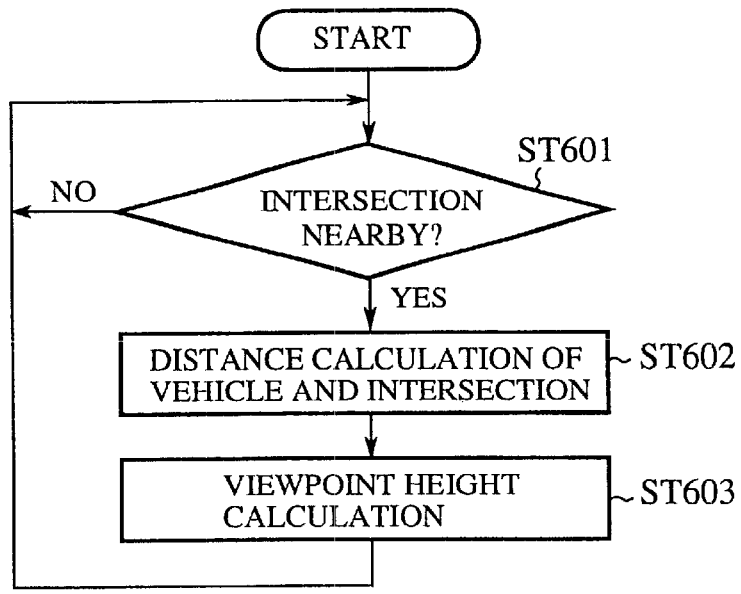
FIG. 7 is a flowchart of the operation of a second embodiment of the present invention.

FIG. 7 is a flowchart which shows the operation of a second embodiment of the invention.

In the calculation device 4, on approaching an intersection (step ST601), an intersection distance calculation means 52 calculates a distance between the vehicle position and an intersection (step ST602). The 3 dimensional display means 6 calculates the height of a viewpoint so that the height of the viewpoint decreases in order to perform 3 dimensional display the smaller the distance between the detected vehicle position and the intersection becomes (step ST603). Below this operation is repeated until the intersection is passed.

Figure 8:
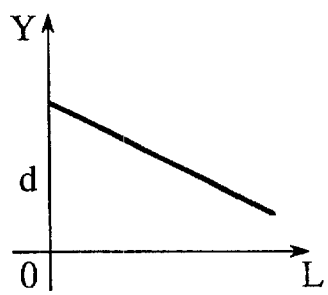
FIG. 8 shows the relationship between the angle of viewpoint and the interval of the vehicle and the viewpoint and the distance of the vehicle position and the intersection according to a second embodiment of the present invention.
Figure 9:
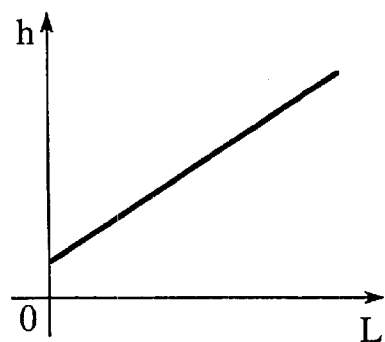
FIG. 9 shows the relationship between the height of the viewpoint and the distance between the vehicle position and the intersection according to a second embodiment of the present invention.

When the height of the viewpoint in order to perform 3 dimensional display is taken to be h, the angle of the viewpoint φ and the interval of the vehicle and the viewpoint d, all the above are determined on the basis of calculating by the distance L of the vehicle position and the intersection. For example, as shown in FIG. 8, the interval d (L) of the viewpoint and the vehicle and the angle of the viewpoint φ(L) increases as the distance L of the vehicle position and the intersection decreases. The height h of the viewpoint increases as the distance L between the vehicle position and the intersection decreases as shown in FIG. 9.

Apart from the distance to the intersection, it is possible to add other conditions such as vehicle speed (for example the higher the vehicle speed, the higher the viewpoint).

As shown above, according to the second embodiment of the invention, since the height of the viewpoint is reduced as the distance between the vehicle position and the intersection becomes smaller, it is possible to create a more realistic appearance of approaching the intersection.

Embodiment 3

Figure 10:
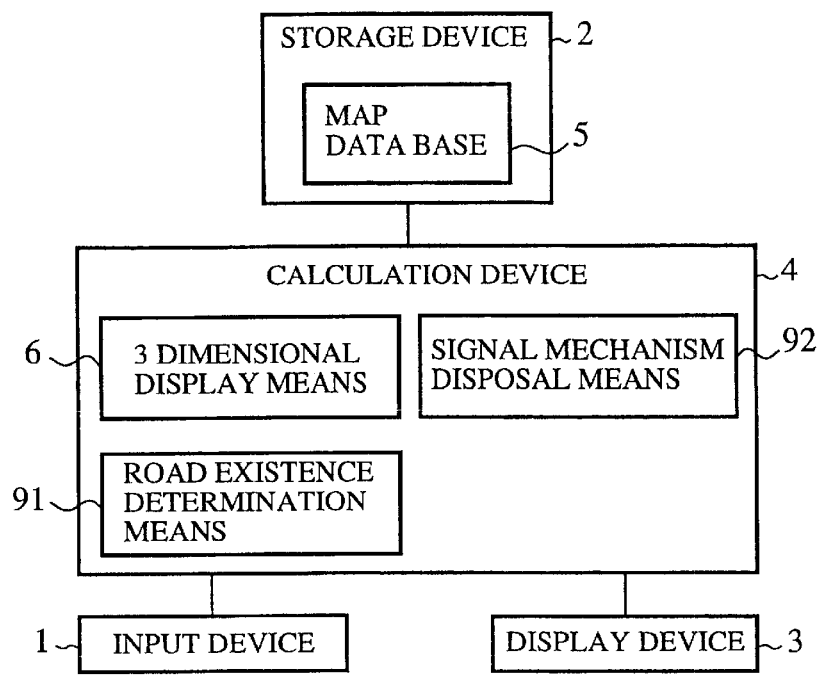
FIG. 10 is a block diagram of a navigation device according to a third embodiment of the present invention.

FIG. 10 shows the layout of a navigation device according to a third embodiment of the present invention. The same elements as in FIG. 1 are designated by similar reference numerals and will not be explained again here. In this navigation device, a calculation device 4 comprises a road existence determination means 91 which determines whether or not a road exists on the left-hand side of the intersection in the direction in which the vehicle is travelling. A signal mechanism disposal means 92 is provided which, when it is determined that a road exists, places a signal mechanism on a position facing the right turn direction of the road in the vicinity of the intersection and which, when it is determined that a road does not exist, places a signal mechanism on a position facing the left turn direction in the direction of vehicle travel in the vicinity of the intersection.

The operation of the invention will now be explained.

Figure 11:
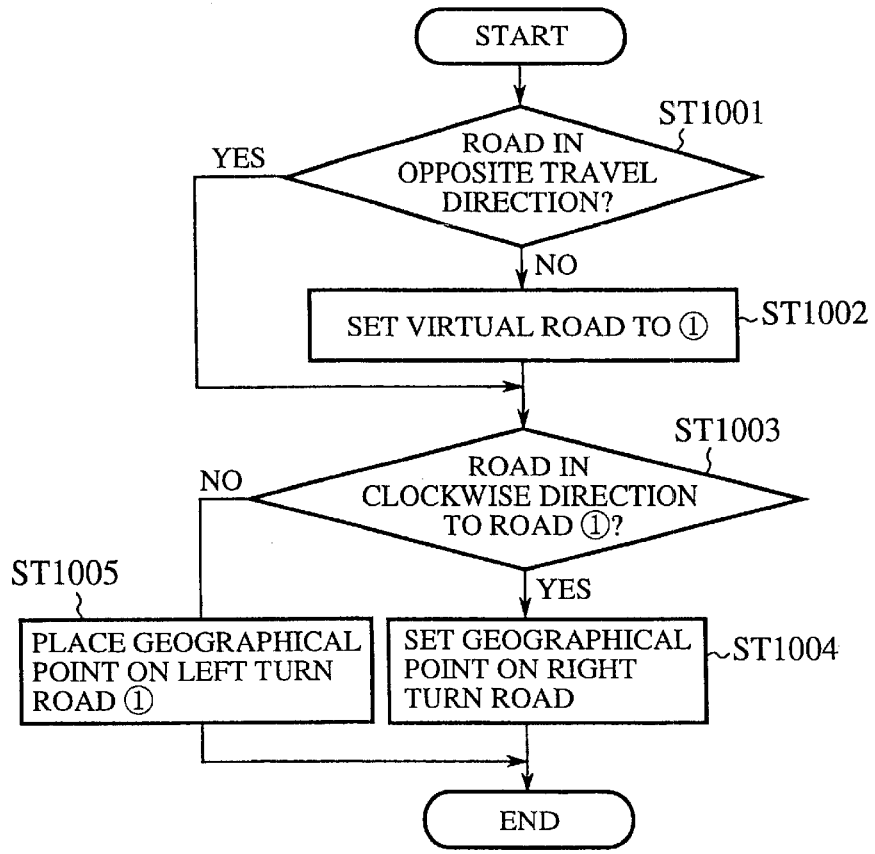
FIG. 11 is a flowchart of the operation of a third embodiment of the present invention.

FIG. 11 is a flowchart showing the operation of a third embodiment of the present invention.

In a calculation device 4, as shown in FIG. 12(a), on approaching an intersection, a road existence determination means 91 determines whether or not a road exists in the opposite direction ② to the direction of travel ① (step ST1001). When a road does not exist in the opposite direction ② to the direction of travel ①, a virtual road (shown by the broken line) is set with respect to ② (step ST1002). Next as shown in FIGS. 12 (b) and (c), the road existence determination means 91 determines whether or not a road exists on the left-hand side from the direction of travel of the vehicle at the intersection, that is to say, in the clockwise direction ③ (step ST1003). The signal mechanism disposal means 92, as shown by FIG. 12 (b), places a signal mechanism in a position ④ facing the right turning direction of the road in the proximity of the intersection when it is determined that there is a road (step ST1004). If it is determined that there is no road, as shown in FIG. 12(c), a signal mechanism is placed at a position ⑤ facing the left turn direction of the road in the proximity of the intersection in the direction in which the vehicle is travelling (step ST1005).

As shown above, according to the third embodiment of the present invention, since a signal mechanism is displayed at a position actually close to an intersection, it is possible to perform the realistic 3 dimensional display of the intersection.

Embodiment 4

Figure 13:
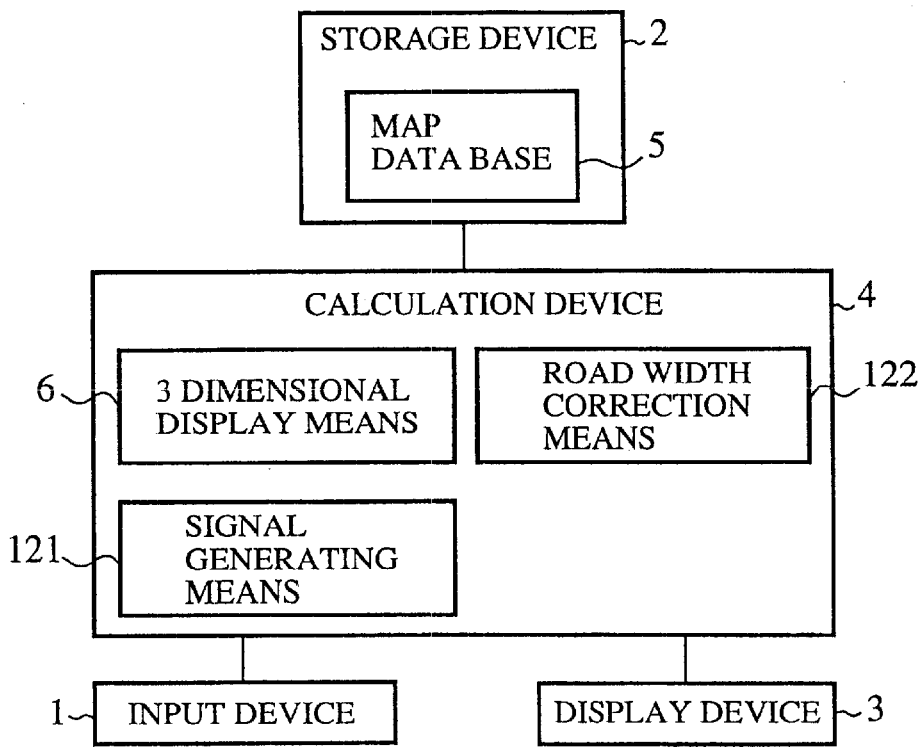
FIG. 13 is a block diagram of a navigation device according to a fourth embodiment of the present invention.

FIG. 13 is a block diagram showing a navigation device according to a fourth embodiment of the present invention. The same elements as in FIG. 1 are designated by similar reference numerals and will not be explained again here. In this navigation device, a calculation device 4 comprises a signal generating device 121 which generates right-hand or left-hand signals at an intersection when a vehicle approaches an intersection which turns left or right, and a road width correction means 122 which corrects a road width so that the transverse width of roads at intersections other than the target intersection is reduced when a vehicle approaches an intersection which turns right or left.

The operation of the invention will now be explained.

Figure 14:
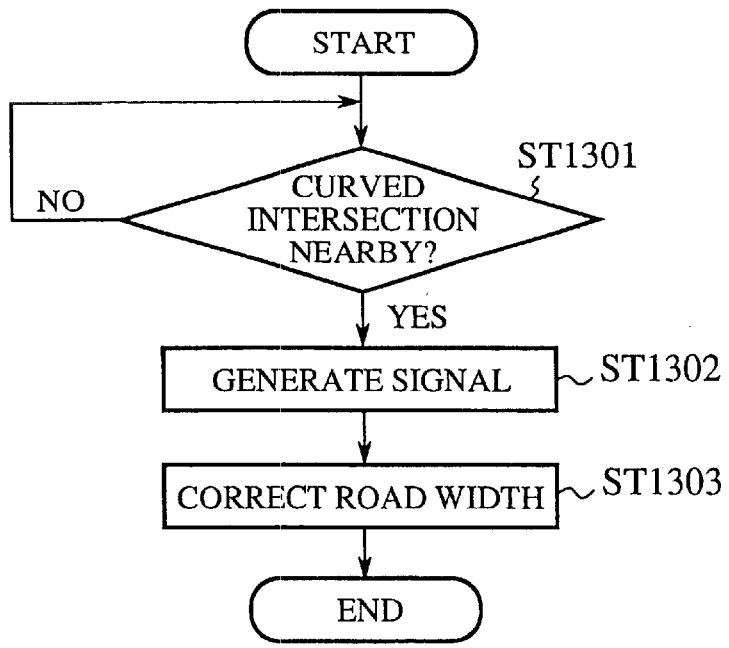
FIG. 14 is a flowchart of the operation of a fourth embodiment of the present invention.

FIG. 14 is a flowchart which shows the operation of a fourth embodiment of the present invention.

Figure 15:
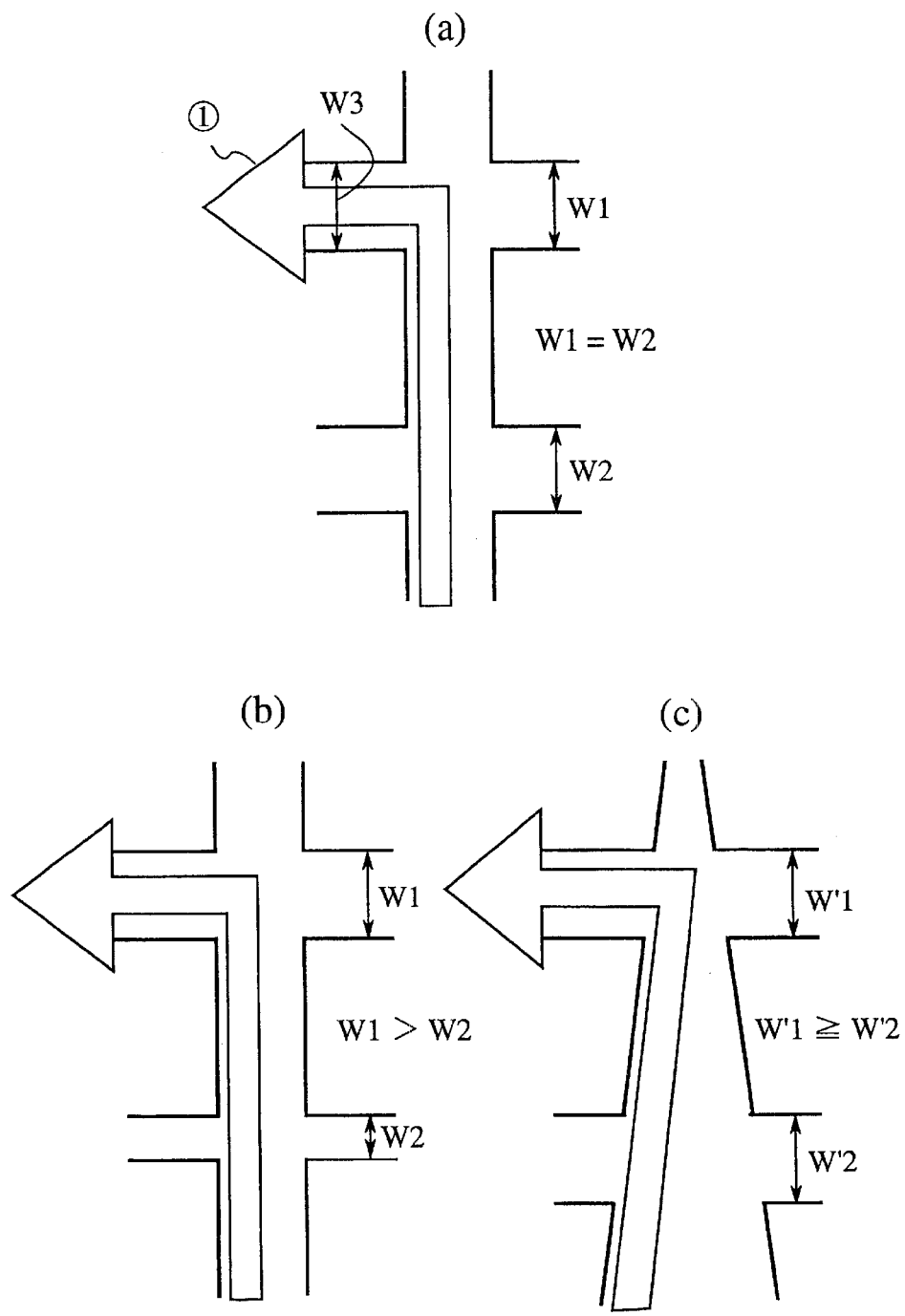
FIG. 15 explains the operation of a fourth embodiment of the present invention.
Figure 16:
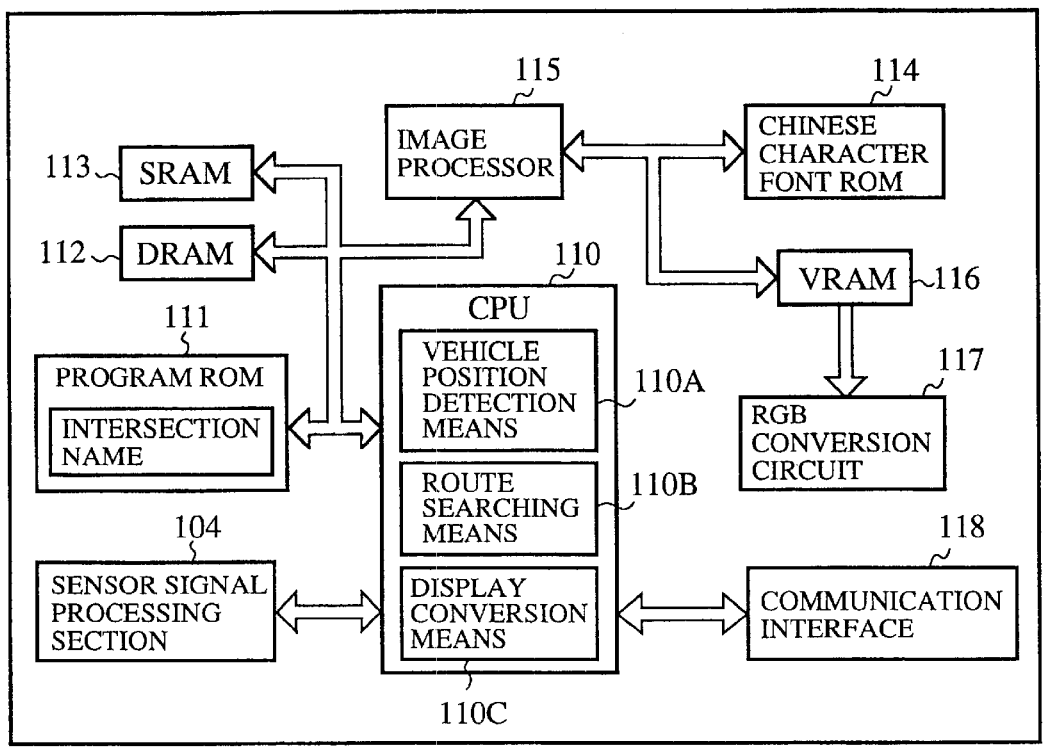
FIG. 16 is a block diagram of a conventional navigation device.
Figure 17:
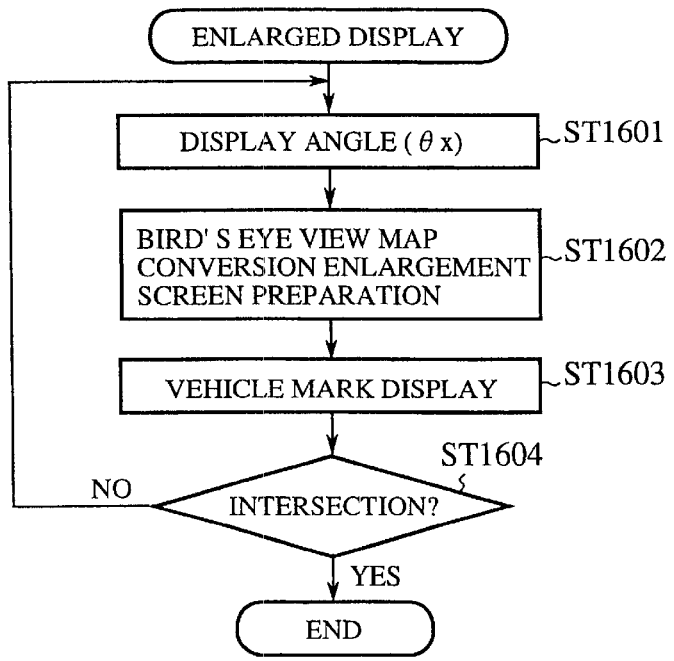
FIG. 17 is a flowchart of the operation of a conventional navigation device.
Figure 18:
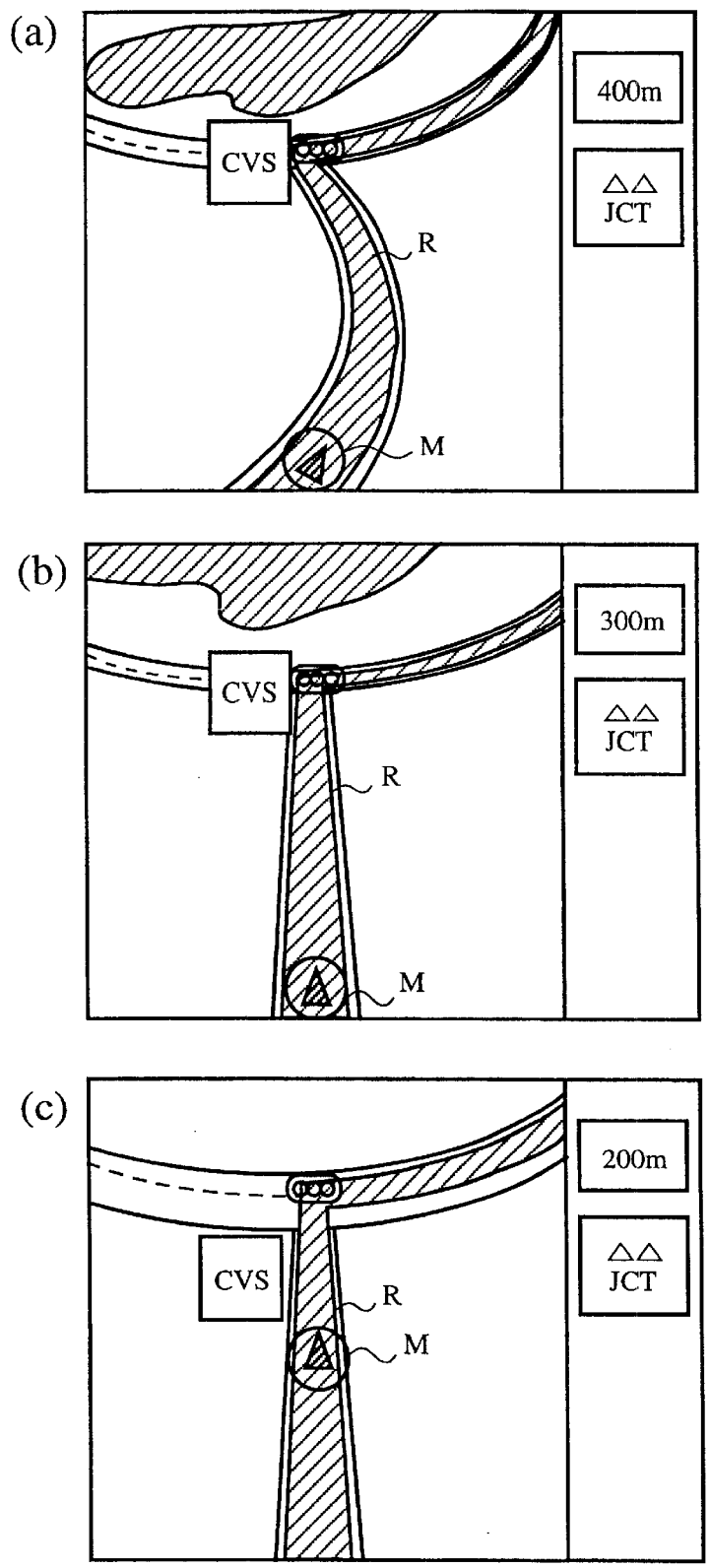
FIG. 18 is a display example of a conventional navigation device.

In a calculation device 4, when a vehicle approaches an intersection which turns right or left (step ST1301), the signal generation means 121 generates a right-hand or left-hand signal ① at the intersection as shown in FIG. 15(a) (step ST1302).

The width correction means 122, as shown in FIG. 15(b), corrects the width, for example by reducing it, so that the transverse width W2 of a road at an intersection other than a target intersection is less than the width W1 of a road at the target intersection (step ST1303). Otherwise it is possible to widen the road width W1.

As shown above, according to the fourth embodiment, as shown in FIG. 15(C), it is possible to recognize a right or left turning intersection without errors since the intersecting roads in the intersection which should turn right or left are shown in a wider form than other roads.

The present embodiment was explained on the basis of an intersection, however, it is possible to vary the course to include three intersecting roads, four intersecting roads, branching roads, merging roads, multi-level crossings as the intersection and includes geographical points of which it is necessary to draw the driver's attention to while driving.

Industrial Applicability

As shown above, the navigation device of the present invention accurately displays an intersection when approaching a targeted intersection for example by the motion of a vehicle. The display realistically creates the appearance of approaching the intersection and allows the recognition of right and left turning intersections without error. The present invention may be adapted to a three dimensional display.

What is claimed is:

1. A navigation device which performs a three dimensional display on approaching an intersection comprising:
   a direction-of-travel detection means which detects the direction in which the vehicle is traveling,
   a direction-to-intersection calculation means which calculates the direction to the position of the intersection,
   a viewpoint direction calculation means which calculates the direction of the viewpoint in order to perform the three dimensional display based on a weighted average of the direction of travel of a vehicle detected by the direction-of-travel detection means and the direction calculated by the direction-to-intersection calculation means,
   a display means which performs display based on the viewpoint direction calculated by the viewpoint direction calculation means.

2. A navigation device according to claim 1 comprising:
   a traffic signal disposition means which disposes a traffic signal at a position which is close to an actual position on an intersection when an intersection is determined to exist in a direction of vehicle travel, and wherein said navigation device is adapted to display said traffic signal at a position disposed by said traffic signal disposition means.

3. A navigation device according to claim 2 comprising:
   a road existence determination means which determines whether a road exists on a left side at an intersection from the direction in which the vehicle is travelling and
   a signal mechanism disposal means which places a signal mechanism at a position facing a right turning direction of a road in the vicinity of an intersection when a road is determined to exist by the road existence determination means, and which places a signal mechanism at a position facing a left turning direction of a road in the direction in which a vehicle is travelling in the vicinity of an intersection, when a road is determined not to exist by the road existence determination means and wherein
   said navigation device performs display of a signal mechanism which is placed at a position by the signal mechanism disposition means.

4. A navigation device according to claim 2 comprising:
   a road existence determination means which determines whether a road exists on a left side at an intersection from the direction in which the vehicle is travelling,
   a signal mechanism disposal means which places a signal mechanism at a position facing a right turning direction of a road in the vicinity of an intersection when a road is determined to exist by the road existence determination means, and which places a signal mechanism at a position facing a left turning direction of a road in the direction in which a vehicle is travelling in the vicinity of an intersection, when a road is determined not to exist by the road existence determination means and wherein
   said navigation device performs display of a signal mechanism which is placed at a position by the signal mechanism disposition means.

5. A navigation device according to claim 1, comprising:
   a sign generating means which generates a left or right turn signal at an intersection when a vehicle approaches a right turning or left turning intersection, and
   a road width correction means which corrects a road width so that a width of a road crossing an intersection other than a target intersection is less than that of a road width of a target intersection and wherein
   a signal generated by the signal generating means is displayed on an intersection and an intersection other than a target intersection is displayed with a corrected road width by the road width correction means.

6. A navigation device which performs a three dimensional display on approaching an intersection comprising:
   a vehicle position detection means which detects a vehicle position,
   intersection distance calculation means which calculates a distance from a vehicle position detection by the vehicle position detection means to an intersection,
   viewpoint position calculation means which calculates the height of a viewpoint so that the height of a viewpoint in order to perform three dimensional display decreases as the distance from a vehicle position to an intersection detected by the intersection distance detection means decreases,
   a display mean s which carries out display based on a viewpoint height calculated by the viewpoint position detection means,
   a signal generating means which generates a left or right turn signal at an intersection when a vehicle approaches a right turning or left turning intersection, and
   a road width correction means which corrects a road width so that a width of a road crossing an intersection other than a target intersection is less than that of a road width of a target intersection and
   wherein a signal generated by the signal generating means is displayed on an intersection and an intersection other than a target intersection is displayed with a corrected road width by the road width correction means.

* * * * *